(12) United States Patent
Hacker et al.

(10) Patent No.: US 6,644,861 B2
(45) Date of Patent: Nov. 11, 2003

(54) VEHICLE WHEEL MOUNTING UNIT

(75) Inventors: Robert W. Hacker, Canton, OH (US); Mark Joki, Dover, OH (US)

(73) Assignee: The Timken Company, Canton, OH (US)

( * ) Notice: Subject to any disclaimer, the term of this patent is extended or adjusted under 35 U.S.C. 154(b) by 47 days.

(21) Appl. No.: 10/040,596

(22) Filed: Jan. 7, 2002

(65) Prior Publication Data

US 2003/0128904 A1 Jul. 10, 2003

(51) Int. Cl.[7] .............................. F16C 3/00; F16C 19/28; F16C 43/04
(52) U.S. Cl. ................. 384/589; 29/898.07; 29/898.09; 384/544
(58) Field of Search ................................ 384/517, 512, 384/510, 519, 537, 540, 544, 559, 560, 562, 563, 571, 583, 584, 585, 589; 29/898.09, 898.07

(56) References Cited

U.S. PATENT DOCUMENTS

| | | | | |
|---|---|---|---|---|
| 4,054,999 A | * | 10/1977 | Harbottle | 29/898.07 |
| 4,172,621 A | * | 10/1979 | Yoshida | 384/563 |
| 4,336,641 A | * | 6/1982 | Bhatia | 29/898.09 |
| 4,618,159 A | | 10/1986 | Kozyra et al. | |
| 4,732,497 A | * | 3/1988 | Sawa et al. | 384/585 |
| 5,325,599 A | * | 7/1994 | Russell | 33/517 |
| 5,499,832 A | * | 3/1996 | Iwamoto et al. | 384/544 |
| 5,620,263 A | * | 4/1997 | Ohtsuki et al. | 384/517 |
| 5,740,895 A | | 4/1998 | Bigley | |
| 5,772,285 A | | 6/1998 | Bigley et al. | |
| 5,941,335 A | | 8/1999 | Krisher | |
| 5,984,422 A | | 11/1999 | Seifert | |
| 6,212,981 B1 | | 4/2001 | Brinker et al. | |
| 6,250,814 B1 | | 6/2001 | Tajima et al. | |
| 6,491,440 B1 | | 12/2002 | Sahashi et al. | |
| 2001/0016520 A1 | | 8/2001 | Sahashi et al. | |
| 2001/0019640 A1 | | 9/2001 | Tajima et al. | |
| 2003/0039423 A1 | | 2/2003 | Sahashi et al. | |

FOREIGN PATENT DOCUMENTS

| | | |
|---|---|---|
| DE | 10047125 | 8/2001 |
| EP | 1018630 | 7/2000 |

* cited by examiner

*Primary Examiner*—Thomas R. Hannon
(74) *Attorney, Agent, or Firm*—Polster, Lieder, Woodruff & Lucchesi, L.C.

(57) ABSTRACT

The present disclosure provides a method of installing a bearing and hub in a steering knuckle. The method provides fitting an outer race into the knuckle with an interference fit, fitting first rolling elements between first raceways such that they seat along the first raceways, ascertaining an axial position of an initially separate inner race that will place the bearing in a predetermined condition of preload when the initially separate inner race is fitted over the hub with an interference fit and against the abutment face, installing the initially separate inner race on the hub with an interference fit and against an abutment face in the positioned ascertained, and capturing the initially separate inner race against the abutment face and in abutment on the hub to insure that it retains the position ascertained and that the bearing operates in preload.

19 Claims, 6 Drawing Sheets

VEHICLE WHEEL MOUNTING UNIT

TECHNICAL FIELD

The present invention relates generally to a vehicle wheel mounting unit. More specifically, it relates to a hub/bearing/knuckle unit wherein the bearing setting is established as the hub/bearing/knuckle unit is assembled.

BACKGROUND OF THE INVENTION

Wheels are typically supported on two rows of rolling element bearings having opposing angular contact races to best support the moments placed on them in cornering. The axial relationship between these two races has often been set with a dimensional interference between the two rows so that the rolling elements have load even when no external loads are applied. This is typically referred to as preload. Normally, the wheel is attached to a hub on which the bearing inner races are located. A suspension component that attaches to control arms, springs and steering linkage, typically called a knuckle, is the support for the bearing and wheel.

Examples of bearing arrangements and setting methods are:

1—Outer races are pressed in a hub and a nut acting against the non-rotating inner races is used for adjustment. This is typical for medium and heavy trucks.

2—A unitized bearing having a pre-established setting is pressed into a knuckle and a nut is tightened to clamp the inner races of the hub/bearing assembly. The pre-established setting must accommodate the press fit.

3—A unitized bearing having a pre-established setting is bolted to the knuckle. The main difficulty with the first method is that the bearings can, and in fact must, be adjusted and sometimes this adjustment is poorly done by inexperienced people. It is extremely difficult to maintain accurate bearing setting using the second method due to dimensional changes as the bearing is pressed into the knuckle. The third arrangement has good control of bearing setting, but has the disadvantage of additional weight of two structures at the outer races as well as in the knuckle that each has to be strong enough to withstand the applied loads. There is also an increase in deflections due to load concentrations in the bolted area. The third arrangement also has the disadvantage of extra interface surfaces including the bolt and bolt holes which add to the cost of the assembly.

Other attempts at installing bearings directly into a knuckle have been made, such as those described in U.S. Pat. Nos. 6,250,814 and 6,212,981. However, neither of these patents addresses the concern of adjusting the setting during assembly of the complete hub/bearing/knuckle unit. In each instance, bearing preload relies on tolerances determined before the bearing is installed into the knuckle and, as such, either extremely tight tolerances must be maintained to precisely hold hub runout or accumulation of tolerances prevents the hub runout from being held precisely.

U.S. Pat. No. 5,941,335 claims bearings preloaded by an adjusting mechanism that can, and must, be manually adjusted. As is the case with earlier designs, manual adjustment requires skilled mechanics and is not at all favored in vehicles produced in large quantities.

SUMMARY OF THE INVENTION

The present invention provides a method of combining a bearing, a hub and a steering knuckle as a unit having a predetermined bearing setting. The bearing includes one or more outer races having first and second outer raceways that are inclined in opposite directions with respect to an axis of rotation of the hub. First and second inner raceways are presented toward and inclined in the same directions as the first and second outer raceways, respectively. At least the second inner raceway is on an inner race having an outboard extension and is initially separate from the hub. The outboard extension contacts an abutment face that is along the hub that establishes the second inner raceway's axial position. Rolling elements are organized in a first row between the first raceways and in a second row between the second raceways. The bearing will transmit radial loads and thrust loads in both axial directions between the knuckle and the hub.

The method comprises fitting one or more outer races into the knuckle, ascertaining the axial length of the outboard extension on the initially separate inner race that will place the bearing in a predetermined condition of preload when the initially separate inner race is fitted over the hub and against the abutment face, providing and installing said initially separate inner race having the ascertained outboard extension length on the hub and against the abutment face, and clamping the initially separate inner race against the abutment face to insure that the bearing remains in preload.

In a second aspect, the invention provides a unit for mounting a road wheel to an automotive vehicle. The unit comprises a knuckle, a hub and a bearing. The knuckle has a cavity that opens laterally out of the knuckle. The hub has an abutment face on a spindle located in the cavity of the knuckle and a flange located beyond the cavity for providing a surface along which the road wheel is secured. The bearing is located between the knuckle and the spindle of the hub for enabling the hub to rotate in the knuckle about an axis that is fixed in position with respect to knuckle. The bearing includes one or more outer races fitted into the cavity of the knuckle. The one or more outer races have first and second outer raceways that are presented inwardly toward the axis and are inclined with respect to the axis in opposite directions. A first inner raceway is carried by the hub spindle and presented outwardly toward and inclined in the same direction as the first outer raceway. An initially separate inner race has a second inner raceway that is presented outwardly toward and inclined in the same direction as the second outer raceway. The initially separate inner race has an outboard extension. First rolling elements are organized in a first row to operate between the first raceways, and second rolling element organized in a second row to operate between the second raceways. The length of the outboard extension has been ascertained after the one or more outer races have been installed in the knuckle such that when the outboard extension contacts the abutment face the bearing operates in preload. Finally, the inner races and rolling elements having been installed in the knuckle cavity with the outboard extension clamped against the abutment face preventing the initially separate inner race from moving away from the abutment face.

DETAILED DESCRIPTION OF THE PREFERRED EMBODIMENT

Figure 1:
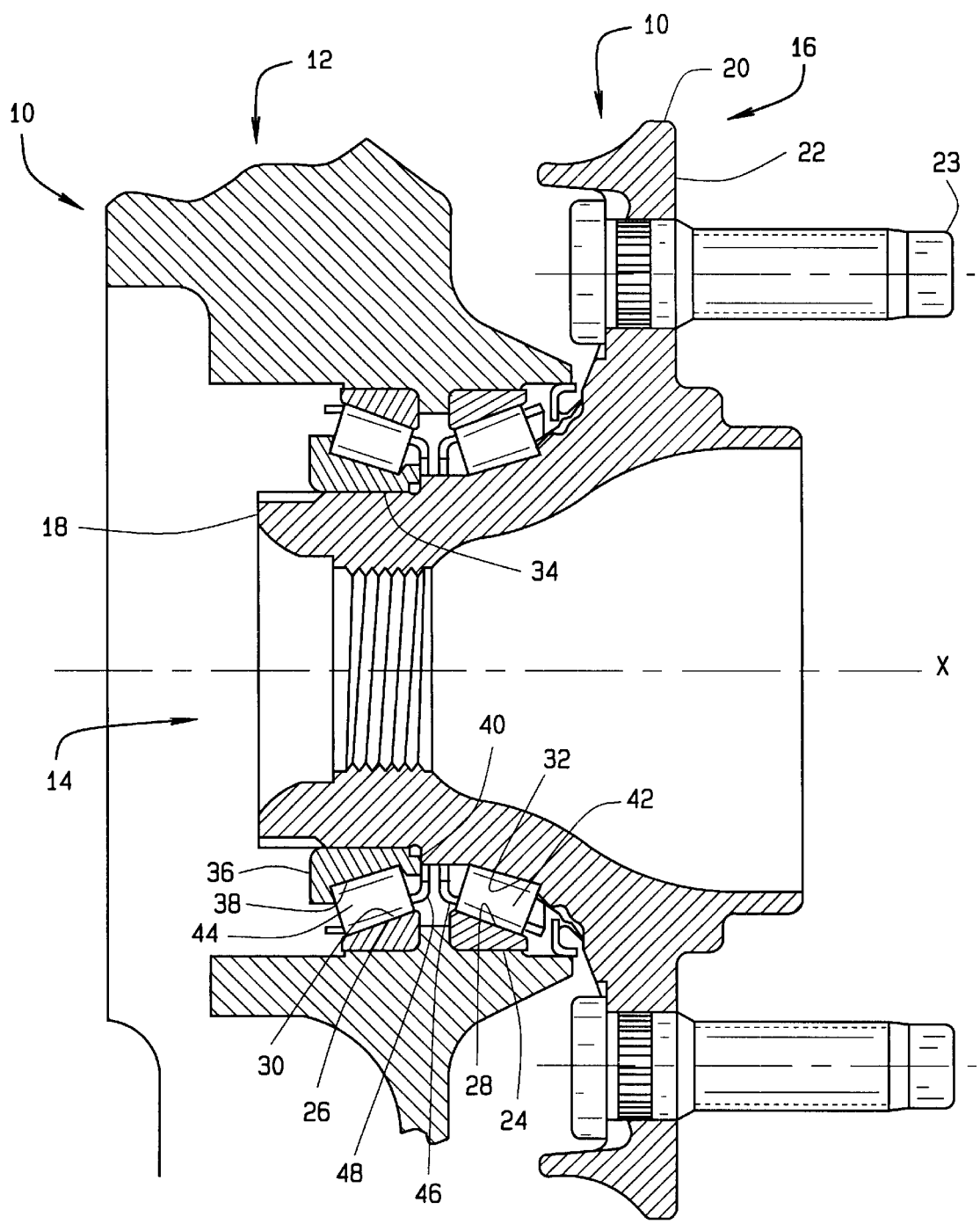
FIG. 1 is a sectional view of a hub/bearing/knuckle unit assembled according to an embodiment of the present invention.

While the invention is capable of embodiment in many different forms, there is shown in the drawings and will herein be described in detail preferred embodiments of the invention. It is to be understood that the present disclosure is to be considered only as an example of the principles of the invention. This disclosure is not intended to limit the broad aspect of the invention to the illustrated embodiments. For example, the bearing shown is a tapered roller bearing, but the invention applies to any type of angular contact bearing. The scope of protection should only be limited by the accompanying claims.

Figure 8:
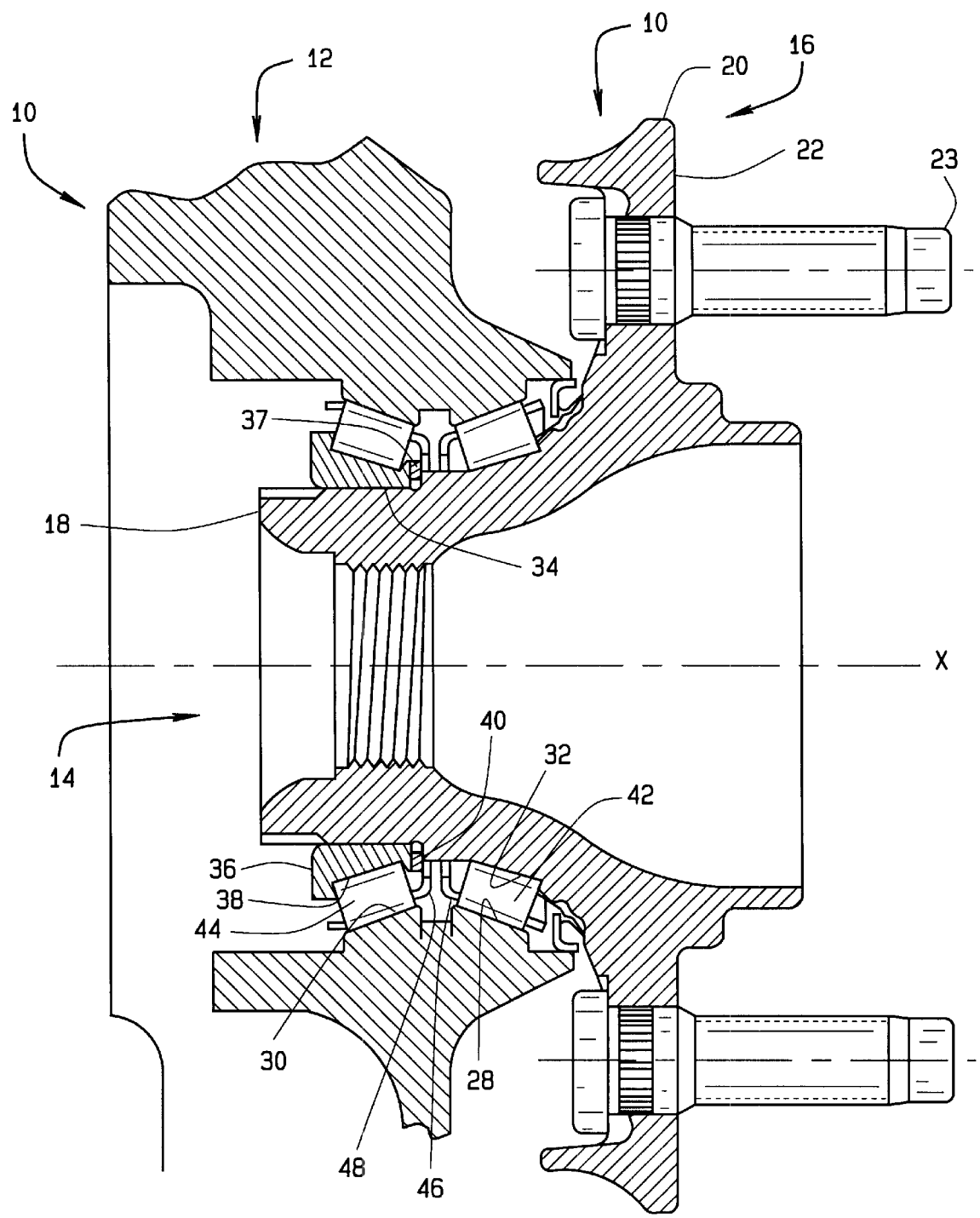
FIG. 8 is a sectional view of a hub/bearing/knuckle unit assembled according to another embodiment of the present invention.

Referring to FIG. 1, there is provided an assembly 10 for providing a mounting for a brake rotor and a road wheel (not shown) of an automotive vehicle. The assembly 10 comprises a knuckle 12 having a cavity 14 that opens laterally out of the knuckle 12. The assembly 10 further comprises a hub 16 having a spindle 18 located in the cavity 14 of the knuckle 12 and a flange 20 located beyond the cavity 14 for providing a surface 22 along which the brake rotor and road wheel (not shown) are secured. Lugs 23 are provided to bolt the road wheel to the flange 20. A bearing is located between the knuckle 12 and the spindle 18 of the hub 16 for enabling the hub 16 to rotate in the knuckle 12 about an axis X that is fixed in position with respect to knuckle. The bearing includes a first outer race 24 and a second outer race 26. The outer races 24, 26 are fitted into the cavity 14 of the knuckle 12. The first outer race 24 has a first outer raceway 28, and the second outer race 26 has a second outer raceway 30. The outer raceways 28, 30 are presented inwardly toward the axis X and are inclined with respect to the axis X in opposite directions. Alternatively, one or both of the first and second outer races 24, 26 may be formed integrally with the knuckle 12 (FIG. 8).

The hub 16 includes a first inner raceway 32 carried by the hub spindle 18 and presented outwardly toward and inclined in the same direction as the first outer raceway 28. A radial abutment face 34 is carried by the spindle 18 beyond a small end of the inclined first inner raceway. A second inner race 36 that is initially separate from the hub 14 comprises a second inner raceway 38 that is presented outwardly toward, and inclined in the same direction as, the second outer raceway 30. The second inner race 36 has an outboard extension 40 that, when the second inner race 36 is installed, is placed against the radial abutment face 34. Between the first inner race raceway 32 and the first outer raceway 28 are disposed a first plurality of rolling elements 42, and between the second inner raceway 38 and the second outer raceway 30 are disposed a second plurality of rolling elements 44. The first rolling elements 42 are maintained in a spaced relationship by a first cage 46 and the second rolling elements 44 are maintained in a spaced relationship by a second cage 48.

Figure 2:
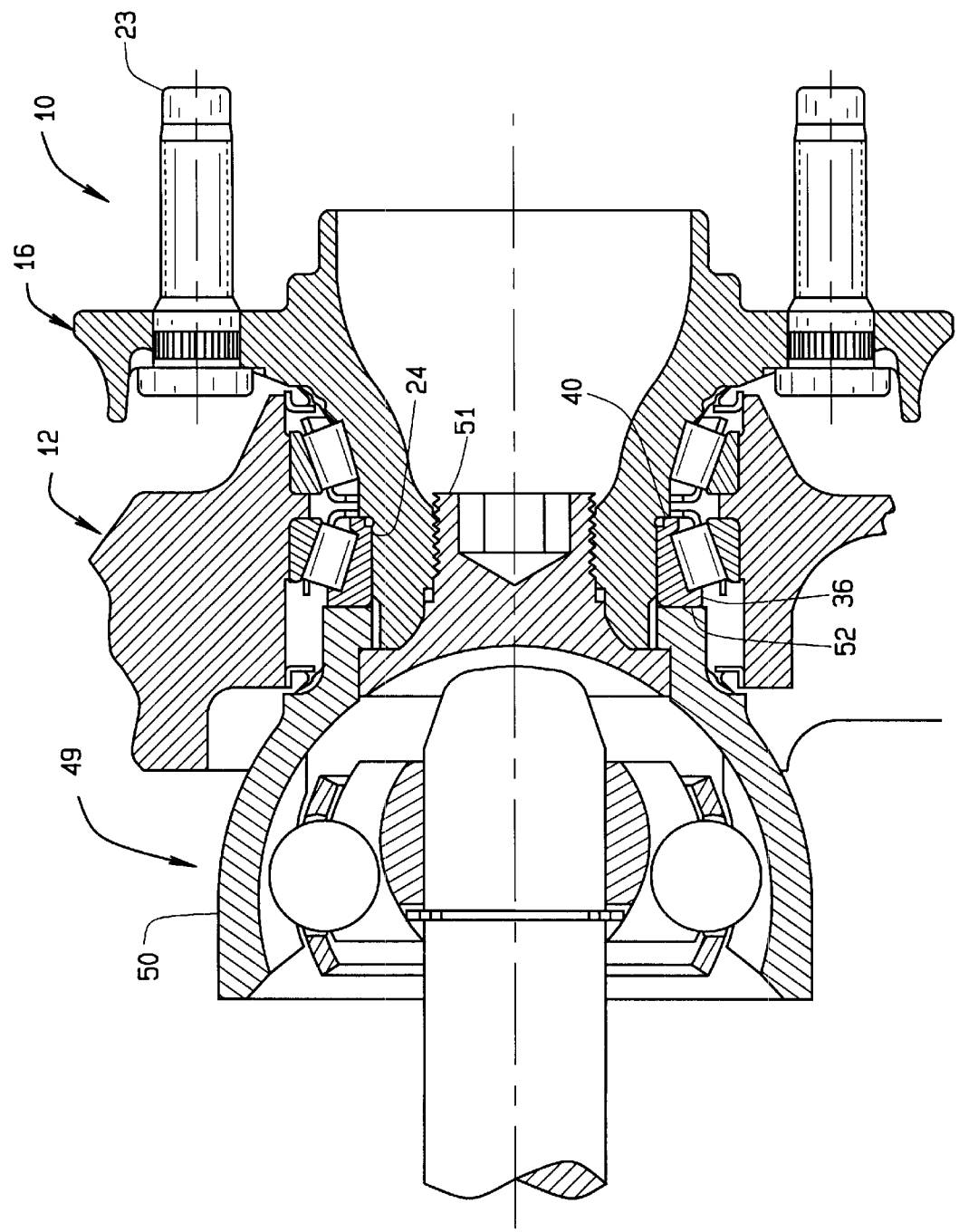
FIG. 2 is a sectional view of a hub/bearing/knuckle unit assembled according to an embodiment of the present invention with a constant velocity joint clamped between the abutment face and the second inner race

Referring to FIG. 2, there is further provided an abutment 50 on the spindle 18 for preventing the initially separate second inner race 36 from moving away from the radial abutment face 34. Preferably, the abutment 50 is an outer member of a constant velocity joint 49 as shown in FIG. 2 and described in U.S. patent application Ser. No. 09/967,182, incorporated herein by reference. An attachment member 51 maintains the abutment 50 in position. Alternatively, the abutment 50 may be a portion of the spindle that has been plastically deformed in an outward radial direction.

Figure 3:
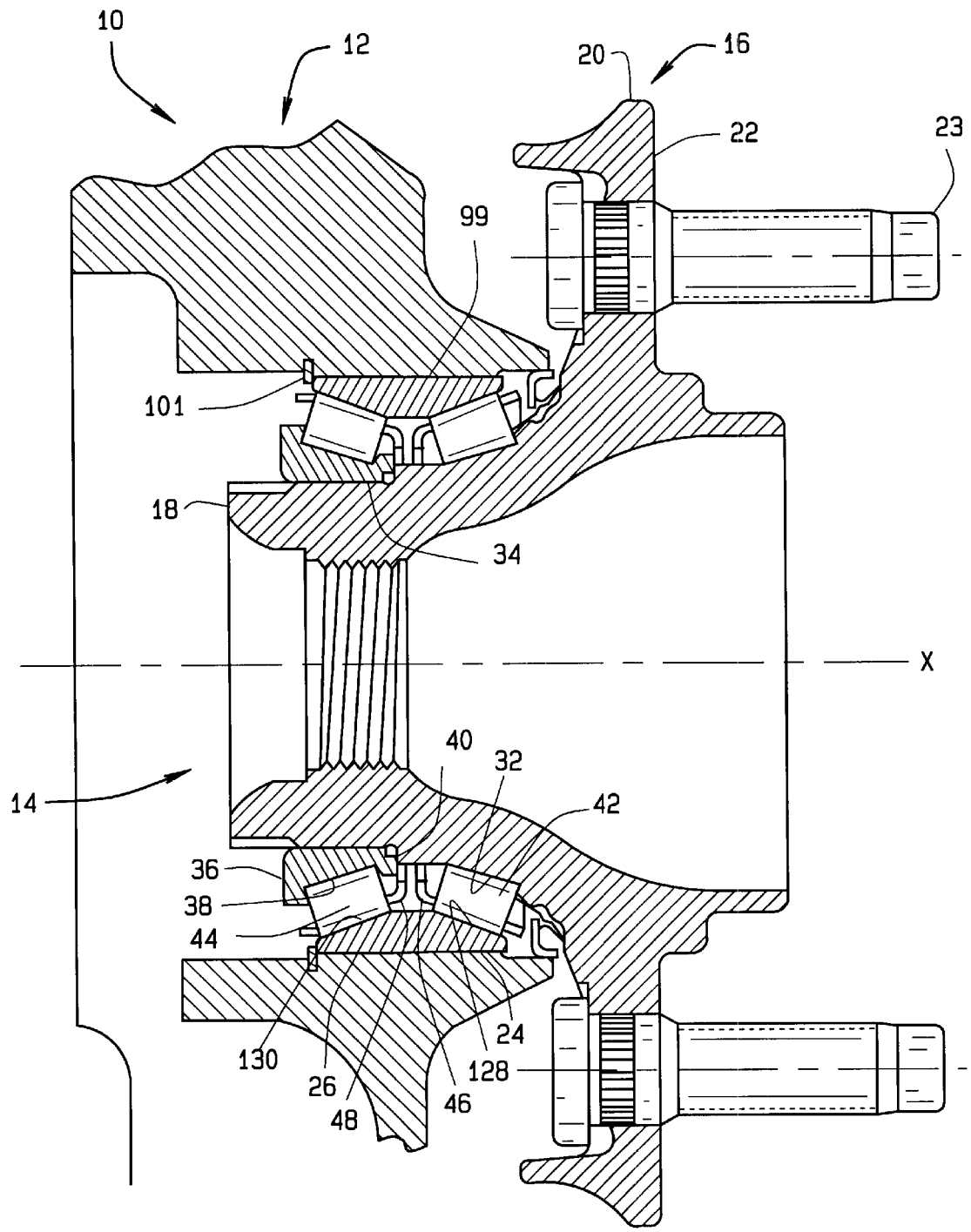
FIG. 3 is a sectional view of a hub/bearing/knuckle unit with a single outer race according to a second embodiment of the present invention.

Referring to FIG. 3, in another aspect of the present invention, the first and second outer races 24, 26 are replaced with a single outer race 99. Upon the single outer race 99 are located first and second outer raceways 128, 130. The single outer race 99 is located within the knuckle 12 and maintained within the knuckle 12 by some means such as a snap ring 101. Other means may be used to retain the race in the knuckle such as staking or cold forming a portion of the knuckle. In this manner, the two outer races 24, 26 which provide outer raceways 28, 30 are replaced by a single outer race 99 providing outer raceways 128, 130.

In the above designs it is necessary to determine the required length of the outboard extension 40 on the initially separate second inner race 36 that will place the bearing in a predetermined condition of preload after the initially separate second inner race 36 is fitted over the hub with an interference fit and against the abutment face 34. A more precise setting is obtained if this determination is made after the outer races 24, 26 are installed in the knuckle 12. There are many ways to do this.

Figure 4:
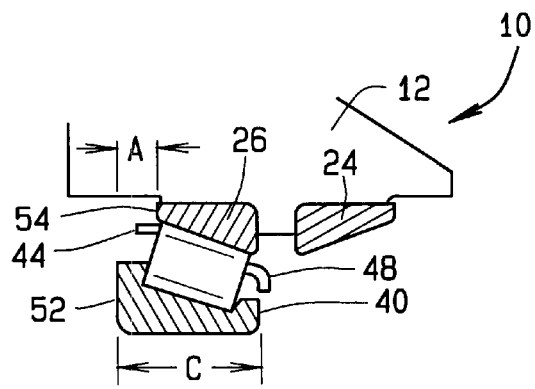
FIG. 4 is a partial sectional view of a hub/bearing/knuckle unit being assembled according to an embodiment of the present invention.
Figure 5:
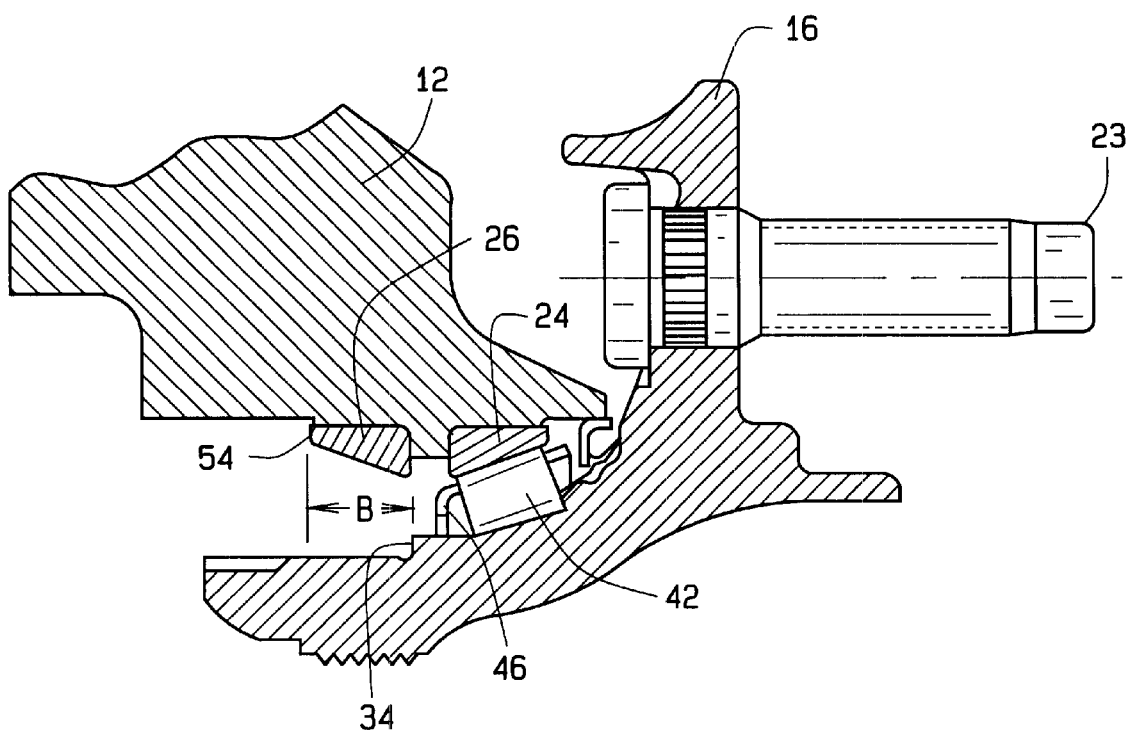
FIG. 5 is a partial sectional view of a hub/bearing/knuckle unit being assembled according to an embodiment of the present invention.

Referring to FIG. 4 and FIG. 5, one manner of ascertaining the correct length of the outboard extension 40 of the second inner race 36 is to install the outer races 24, 26 in knuckle 12 with an interference fit; install the initially separate second inner race 36; and measure distance A and C. Initially separate inner race 36 is then removed and hub 16 is placed within first and second outer races 24, 26 with the first plurality of rolling elements 42 and first cage 46 between the first raceways 28, 32 such that they seat along the first raceways. Dimension B is then measured. Outboard extension 40 is purposefully manufactured too long so that it can be machined to fit for example, by turning, grinding, or honing to give the desired preload. The length to be removed from the outboard extension 40 is equal to C−A−B+P, where P is the desired preload.

It is known that pressing second inner race 36 on to spindle 18 with an interference fit will further increase preload beyond the expected amount as determined from measurements A, B, and C. A more precise preload setting maybe achieved by making a nominal allowance for this when determining the amount to be machined from radial front face 40. Even greater precision may be obtained by measuring the actual inside diameter of inner race 36 and the outer diameter of spindle 18 and making a very specific allowance based on the specific interference fit.

Alternatively, rather than machining second inner race 36, a second inner race 36 having the appropriate dimension may be chosen from a plurality of second inner races 36 which have differing dimensions. As yet another alternative, shown in FIG. 8, a spacer 37 may be provided between the second inner race and the first inner race and the spacer 37 may be machined to the appropriate dimension or chosen from a plurality of spacers of differing dimensions. Alternatively, the abutment 34 can be machined. While there are numerous means to determine the required amount to be removed from the outboard extension the precise methods would have the outer races installed in the knuckle before any measurements are made.

After the correct length of the outboard extension 40 has been provided, the initially separate second inner race 36 is placed over the spindle 18 of the hub 14 with an interference fit. The second inner race 36 is forced over the spindle 18 until the outboard extension 40 meets the radial abutment face 34. As a result, the second inner race 36 will be in the ascertained position. Finally, the second inner race 36 will be captured on the spindle 18 and prevented from moving away from the abutment face 34. Preferably, the method of capturing the second inner race 36 is by fastening an outer u-joint member against the second inner race 36.

Figure 6:
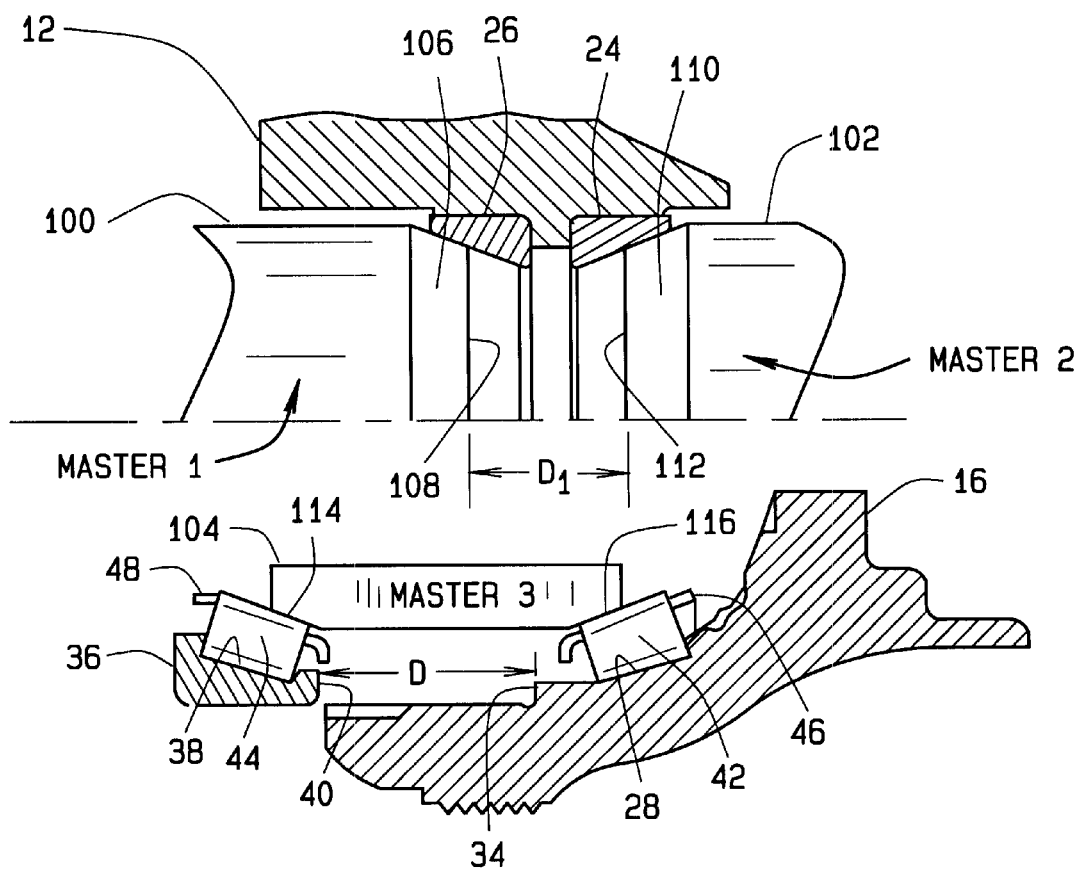
FIG. 6 is a sectional view of a hub/bearing/knuckle unit being assembled according to a second embodiment of the present invention.

Referring to FIG. 6, another manner of ascertaining the correct length of the outboard extension 40 of the second inner race 36 is to use master gauges 100, 102, 104. The first master gauge 100 comprises a conical tapered surface 106 and an end surface 108. The second master gauge 102 comprises a conical tapered surface 110 and an end surface 112. A median diameter of the conical tapered surfaces 106, 110 and the end surfaces 108, 112 of the first and second master gauges 100, 102 are at known distances from each other. The third master gauge 104 comprises a hollow cylinder having two conical tapered surfaces 114, 116 on interior of the hollow cylinder at opposite ends thereof. A median diameter of each of the tapered surfaces 114, 116 is machined at a known distance from one another.

To assemble the knuckle, the outer races 24, 26 are installed within the knuckle 12 with interference fit. Next, master gauges 100, 102 are inserted within the outer races 24, 26 and a distance $D_1$ is measured between adjacent end surfaces 108, 112 of the master gauges 100, 102. The rolling elements 42 and the cage 46 are then place over the first inner raceway 28 of the hub 12, and the hub is inserted within the third master gauge 104 such that the rolling elements 42 contact the tapered surface 116. Next, the rolling elements 44 and the cage 48 are placed about the raceway 38 of the second inner race 36. The race 36 is then placed such that the rolling elements 44 contact the tapered surface 114 of the third master gauge 104. Finally, a distance $D_2$ is measured between the radial abutment face 34 of the hub 12 and the outboard extension 40 of the second inner race 36. The dimensions $D_1$ and $D_2$ are then used to calculate the amount of material to remove from the outboard extension 40 or the radial abutment face 34 to obtain the desired preload, and the hub/bearing assembly is assembled. If the second inner race 36 is pressed onto the hub 16 with an interference fit, a nominal correction may be made in the amount of material to be machined in order to account for expansion of the inner race 36 after being pressed on to the hub 16.

Figure 7:
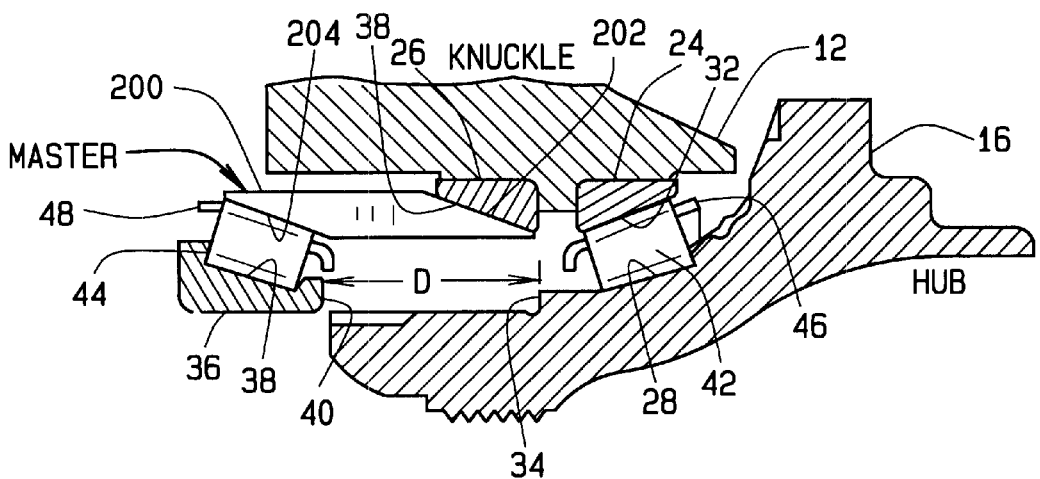
FIG. 7 is a sectional view of a hub/bearing/knuckle unit being assembled according to a third embodiment of the present invention.

Referring to FIG. 7, a single master gauge 200 can be used to determine the amount of material to be removed from the outboard extension 34 in order to arrive at the desired bearing preload. The master gauge 200 comprises a hollow cylinder having a conical surface 202 upon the exterior of the cylinder at a first end and a parallel, conical surface 204 upon an interior surface at the opposite end. The distance between the median diameter of each of the surfaces 202, 204 is a known value. First, the first and second outer races 24, 26 are pressed within the knuckle 12. Next, the rolling elements 42 are placed against the first inner raceway 28 with the cage 46 in place, and the hub 16 is placed within the knuckle 12 such that the rolling elements 42 also contact the first outer raceway 32. The hub/bearing unit thus partially assembled is then placed on the master gauge 200 such that the raceway 38 of the second outer race 26 contacts the conical surface 202 of the master gauge 200. Finally, the rolling elements 44 and cage 48 are positioned against the raceway 38 of the second inner race 36 and against the surface 204 of the master gauge. A dimension D is measured between the radial abutment face 34 and the outboard extension 40 of the second inner race 36. The dimension D is then used to calculate the amount of material to remove from the outboard extension 40 or the radial abutment face 34 to obtain the desired preload, and the hub/bearing assembly is assembled. If the second inner race 36 is pressed onto the hub 16 with an interference fit, a nominal correction may be made in the amount of material to be machined in order to account for expansion of the inner race 36 after being pressed on to the hub 16.

Additionally, any of the foregoing methods may be implemented in an automated process, such as that disclosed in European Patent Publication EP1018630A2, to determine the amount of material to be removed from the outboard extension 34 of the second inner race 36 or the radial abutment face. The contents of European Patent Publication EP1018630A2 are expressly incorporated herein by reference.

While the specific embodiments have been illustrated and described, numerous modifications come to mind without significantly departing from the spirit of the invention, and the scope of protection is only limited by the scope of the accompanying claims.

We claim:

1. A method of assembling a bearing/hub/steering knuckle unit, the bearing including an outer race having first and second outer raceways that are inclined in opposite directions with respect to the axis, first and second inner raceways that are presented toward and inclined in the same directions as the first and second outer raceways, respectively, at least the second inner raceway being on an inner race that is initially separate from the hub, with its axial position being established by an abutment face that is along the hub, and rolling elements organized in a first row between the first raceways and in a second row between the second raceways, whereby the bearing will transmit radial loads and also thrust loads in both axial directions between the knuckle and the hub, said method comprising: providing outer raceways in the knuckle; fitting the first rolling elements between the first raceways such that they seat along the first raceways; ascertaining the axial position of the initially separate inner race that will place the bearing in a predetermined condition of preload when the initially separate inner race is fitted over the hub with an interference fit and against the abutment face; providing a correction to the ascertained axial position of the initially separate inner race to account for expansion of the initially separate inner race caused by interference fit of the race on the hub; providing an initially separate inner race that will provide the required axial position; installing the initially separate inner race on the hub with an interference fit and against the abutment face in the position ascertained; and capturing the initially separate inner race against the abutment face and an abutment on the hub to insure that it retains the position ascertained and that the bearing operates in preload.

2. The method of claim 1 wherein the first inner raceway is integral with the hub.

3. The method of claim 1 wherein the abutment on the hub is a constant velocity joint abutting an inboard surface of the second inner race.

4. The method of claim 1 wherein the rolling elements between the first inner and outer raceways and the rolling elements between the second inner and outer raceways are tapered rollers.

5. The method of claim 1 wherein the first and second outer raceways are formed integrally with the knuckle.

6. The method of claim 1 wherein the second inner race comprises a race and a spacer.

7. The method of claim 1 wherein the step of capturing the initially separate inner race against the abutment face comprises attaching an outer member of a constant velocity joint to the hub that contacts an inboard surface of the initially separate inner race.

8. The method of claim 1 wherein the step of fitting the outer race into the knuckle comprises fitting the outer race into the knuckle with an interference fit.

9. The method of claim 1 wherein the abutment on the hub is a shoulder formed by plastically deforming a portion of the hub in a radial direction.

10. A method of assembling a bearing/hub/steering knuckle unit, the bearing including an outer race having first and second outer raceways that are inclined in opposite directions with respect to the axis, first and second inner raceways that are presented toward and inclined in the same directions as the first and second outer raceways, respectively, at least the second inner raceway being on an inner race that is initially separate from the hub, with its axial position being established by an abutment face that is along the hub, and rolling elements organized in a first row between the first raceways and in a second row between the second raceways, whereby the bearing will transmit radial loads and also thrust loads in both axial directions between the knuckle and the hub, said method comprising: providing outer raceways in the knuckle; fitting the first rolling elements between the first raceways such that they seat along the first raceways; ascertaining the axial position of the initially separate inner race that will place the bearing in a predetermined condition of preload when the initially separate inner race is fitted over the hub with an interference fit and against the abutment face; providing an initially separate inner race that will provide the required axial position; installing the initially separate inner race on the hub with an interference fit and against the abutment face in the position ascertained; and capturing the initially separate inner race against the abutment face and an abutment on the hub to insure that it retains the position ascertained and that the bearing operates in preload;

wherein the initially separate inner race is the second inner race and the step of ascertaining the axial position of the initially separate inner race further comprises the steps of:
measuring a dimension C from an inner surface to an outer surface of the second inner race;
placing the second inner race within the second outer race with the second rolling elements disposed therebetween;
measuring a dimension A from the outer surface of the second inner race and an outer surface of the second outer race;
mounting the hub within the knuckle with rolling element disposed between the first inner race and first outer race;
measuring a dimension B from a surface of the first inner race and the outer surface of the second outer race;
calculating a finish dimension by subtracting dimension A, dimension B and a desired bearing preload from dimension C to obtain a finish dimension; and
machining the finish dimension from the inner surface of the second inner race.

11. The method of claim 10 wherein the first inner raceway is integral with the hub.

12. The method of claim 10 wherein the abutment on the hub is a constant velocity joint abutting an inboard surface of the second inner race.

13. The method of claim 10 wherein the rolling elements between the first inner and outer raceways and the rolling elements between the second inner and outer raceways are tapered rollers.

14. The method of claim 10 wherein the first and second outer raceways are formed integrally with the knuckle.

15. The method of claim 10 wherein the second inner race comprises a race and a spacer.

16. The method of claim 10 wherein the step of capturing the initially separate inner race against the abutment face comprises attaching an outer member of a constant velocity joint to the hub that contacts an inboard surface of the initially separate inner race.

17. The method of claim 10 wherein the step of fitting the outer race into the knuckle comprises fitting the outer race into the knuckle with an interference fit.

18. The method of claim 10 wherein the abutment on the hub is a shoulder formed by plastically deforming a portion of the hub in a radial direction.

19. A method of providing a pre-set vehicle wheel mounting unit comprising:
providing a knuckle;
providing a hub;
providing a rolling element bearing; and
assembling said knuckle, hub, and bearing together as a unit by ascertaining the axial position of an initially separate inner race by performing the steps of:
measuring a dimension C from an inner surface to an outer surface of the second inner race;
placing the second inner race within the second outer race with the second rolling elements disposed therebetween;
measuring a dimension A from the outer surface of the second inner race and an outer surface of the second outer race;
mounting the hub within the knuckle with rolling element disposed between the first inner race and first outer race;
measuring a dimension B from a surface of the first inner race and the outer surface of the second outer race;
calculating a finish dimension by subtracting dimension A, dimension B and a desired bearing preload from dimension C to obtain a finish dimension; and
machining the finish dimension from the inner surface of the second inner race.

* * * * *